Nov. 25, 1969     S. D. SPEETH ET AL     3,480,912
SOUND LEVEL VISUAL INDICATOR HAVING CONTROL CIRCUITS FOR
CONTROLLING PLURAL LAMPS
Filed Aug. 14, 1968     3 Sheets-Sheet 1

Inventors
SHERIDAN D. SPEETH
PHILIP C. NOREM
By Nolte & Nolte
Attorneys

United States Patent Office 3,480,912
Patented Nov. 25, 1969

3,480,912
SOUND LEVEL VISUAL INDICATOR HAVING CONTROL CIRCUITS FOR CONTROLLING PLURAL LAMPS
Sheridan D. Speeth, Buffalo, N.Y., and Philip C. Norem, Fort Erie, Ontario, Canada, assignors to Peninsula Research & Development Corporation Limited, Fort Erie, Ontario, Canada
Filed Aug. 14, 1968, Ser. No. 752,693
Claims priority, application Canada, May 17, 1968, 20,315
Int. Cl. G01d 7/00; G10g 7/00
U.S. Cl. 340—148    14 Claims

ABSTRACT OF THE DISCLOSURE

A visual sound level indicator for use in a classroom to indicate to a pupil when he is not speaking loud enough. The indicator has a semi-transparent front panel divided into parallel strips each of a different colour with an indicating lamp behind each strip. A microphone and electrical circuit controls the indicator lamps to illuminate the coloured strips in succession so as to indicate the level of the pupil's voice.

---

This invention relates to a sound level indicator and more particularly to a visual sound level indicator for use in school classrooms.

In school classrooms there must be full and complete exchange of verbal information between the pupils and the teacher. A school classroom is often a very large room and some children are not accustomed to such a large room. This is particularly true in the case of some children of Canadian Indian origin and children from poor sectors of a community where speaking loudly is frowned upon and the child may be subject to disciplinary measures if too much noise is made. When such children go to school they have to be continually told to speak up so that the teacher can hear them. The child often interprets this as a hostile act (which may be referred to as "nagging") and this results in a general breakdown of the esprit de corp which is so desirable between the teacher and the children who are being taught. The children's education may thus suffer.

It is an object of the present invention to provide an indicator for use in a classroom whereby a child can immediately see that he needs to speak up so that the teacher can hear and understand him.

According to the present invention, there is provided an indicator for visually indicating the level of sound including: translating means for converting sound waves to electrical waves; means for amplifying the electrical waves; a level-measuring network connected to the output of the amplifying means and adapted to control a plurality of control circuits; the plurality of control circuits each having a respective one of a plurality of indicating lamps connected in circuit with it to control the illumination thereof; whereby as the sound level received by said translating means increases the lamps are illuminated in turn to indicate the level of said sound.

More specifically, according to one embodiment, there is provided translating means for converting sound waves to electrical waves, means for amplifying the electrical waves, a level-measuring network connected to the output of the amplifying means, a series diode-resistor network connected to the output of the level-measuring network whereby an increased current is passed through at least a part of the diode-resistor network in proportion to the level of said sound, a plurality of tapping points provided at intervals along said diode-resistor network, a plurality of transistor control circuits each having a respective one of a plurality of indicating lamps connected in circuit with it to control the illumination thereof, each transistor control circuit including a transistor having a control electrode connected to a respective one of said tapping points, whereby as the sound level received by said translating means increases the lamps are illuminated in turn to indicate the level of said sound.

An embodiment of the present invention will now be described, by way of example, wtih reference to the accompanying drawings in which.

Figure 1:
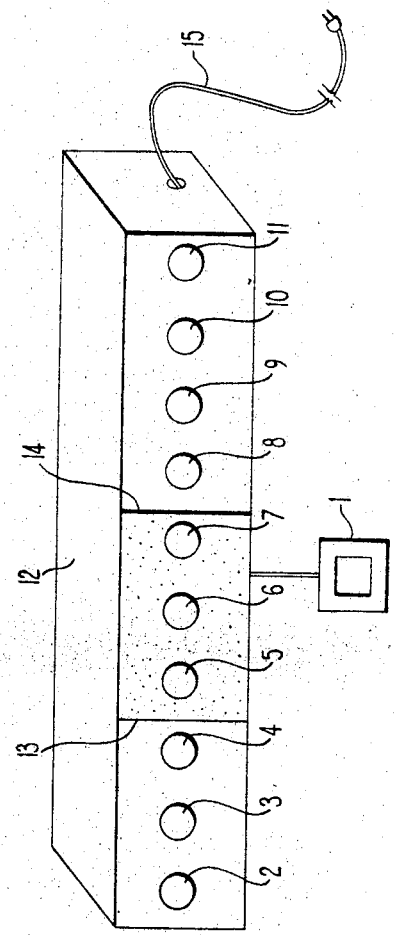
FIGURE 1 is a diagrammatic representation of the indicator as it will appear to children in a school classroom.
Figure 2:
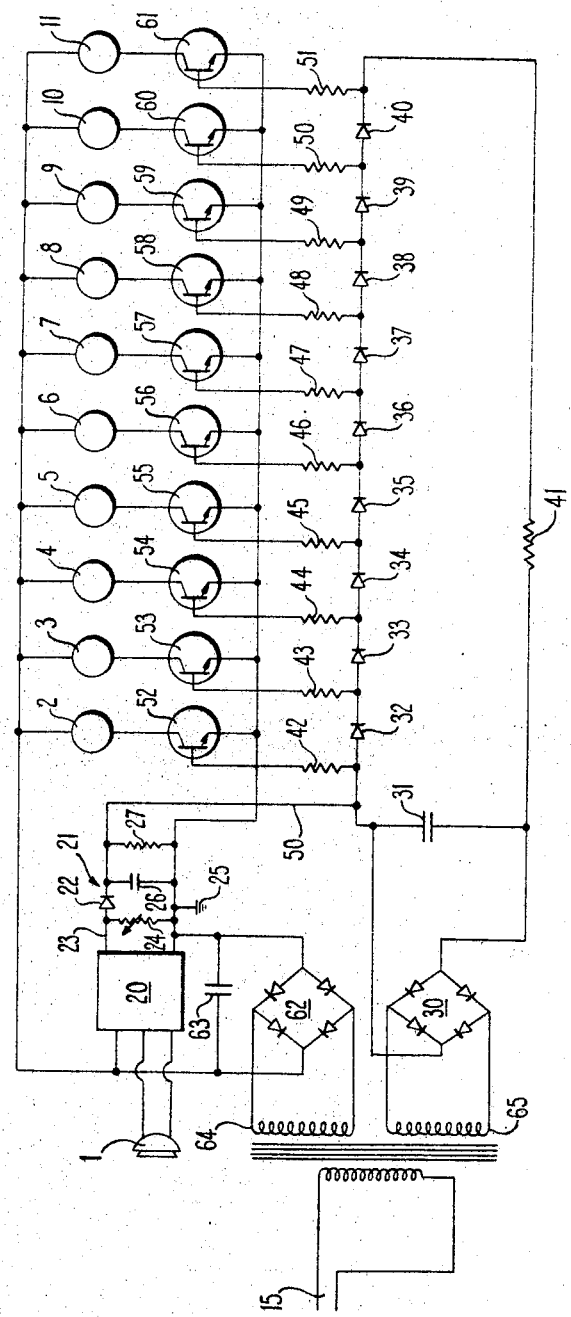
FIGURE 2 is a circuit diagram according to one embodiment of the invention.

Referring to FIGURE 1, it will be seen that in using the invention there is provided a microphone 1 for picking up the sound of a child's voice and converting it to an electrical signal for subsequent use in the electrical circuit of FIGURE 2. An audio amplifier is provided for increasing the level of the sound signal which is then rectified so as to provide a control voltage which is representative of the level of the sound received by the microphone 1. A plurality of lamps 2 to 11 are provided on the outside of the indicator instrument 12 so as to be clearly visible to the children in the school classroom when they are illuminated. Each lamp is connected in an individual control circuit which will be explained with reference to FIGURE 2 whereby each lamp is maintained in an un-energized condition until the sound level received by the microphone 1 reaches a particular value. When a control voltage of a particular value is applied to a respective one of the control circuits then that lamp which is connected in that control circuit is caused to be illuminated so as to indicate to the children that a particular sound level has been reached. The lamps 2 to 11 are so connected in the electrical circuit that they each correspond to a different level of received sound, the lamp 2 when illuminated indicates that the lowest level of sound has been received, lamp 3 the next level, lamp 4 the next level, and so on until lamp 11 indicates that the greatest level of sound has been received by the microphone 1 which can be indicated by the indicator illustrated. Conveniently the electrical circuits may be so arranged that adjacent lamps are illuminated when the sound level changes by a 2 to 3 decibel difference.

The indicator can conveniently be so designed that the middle range of lamps 5, 6 and 7 corresponds to a comfortable listening level for the teacher. This range of lamps can be conveniently marked by providing separating lines 13 and 14 on the case of the indicator instrument 12 as shown in FIGURE 1. The children in the school class room will thus have a clear indication as to when their voices are loud enough to be heard comfortably by the teacher. In order to further assist the children and improve the discrimination factor of the indicator, the lamp covers are colour coated in the spectral hues from red through violet as one goes from left to right, i.e., from lamp 2 to lamp 11.

The indicator could easily be constructed so as to be of a size 20 inches long, 4 inches wide and 4 inches deep and capable of being mounted on the classroom wall above and behind the teacher so that the lamps are clearly visible to the children in the class. The children should quickly learn that the number of bulbs on at any time is indicative of the loudness of their voice and, as will be appreciated, the number of bulbs on at any time will preferably be proportional to the logarithm of the sound intensity at the microphone 1.

The indicator instrument 12 is provided with a suitable power cord 15 so that it can be connected to a convenient A.C. outlet.

Referring to FIGURE 2, the electrical circuit of the sound level visual indicator includes the microphone 1 for receiving sounds applied to it and converting them into electrical signals. The electrical signals are amplified in an electronic amplifier 20 whose output is applied to a level-measuring diode network 21.

The diode network 21 comprises a diode 22 connected in series in one of the output connections 23 of the amplifier 20. A variable resistor 24 is connected across the output of the amplifier 20 between the one output connection to 23 and the other output connection 25 which may be considered as at ground potential. The partly rectified output of diode 22 is applied across capacitor 26 which is connected in parallel with resistor 27 and thence along the connection 28 to a diode-resistor network to be described below.

The voltage across capacitor 26 follows the peaks of the signal and the capacitor 26 has a value so that for peaks of very low duration the voltage will exist for sufficient time to provide an indication.

The diode-resistor network 29 is connected across the output of a full-wave rectifier circuit 30 and a capacitor 31. It includes a number of diodes 32 to 40 connected in series with each other and with a resistor 41. A tapping point is provided between each of the diodes and at each end of the series of diodes and one end of a respective one of a plurality of resistors 42 to 51 is connected to each tapping point as shown in FIGURE 2. The other end of each of the resistors 42 to 51 is connected to the control base electrode of one of a plurality of corresponding transistors 52 to 61 each of the type 2N5183.

As shown in FIGURE 2, each of the indicating lamps 2 to 11 is connected in the emitter-collector path of a different one of the transistors 52 through 61. Thus, each of the transistors 52 through 61 and its appropriate connections comprises a control circuit for a respective one of the indicating lamps 2 through 11. Power for the operation of the amplifier 20 and the various transistor circuits is obtained from the output of a rectifier circuit 62 having a capacitor 63 connected across its output in the normal way and supplied with an A.C. input from the output of a secondary winding 64 of a transformer 65 whose primary winding is connected to an A.C. main supply by way of the input power lead 15.

In use, the rectifier circuit 30 supplies a small current (for example, 10 ma.) through the diode-resistor network and a voltage is developed across each component of the network but the voltage at all the tapping points associated with the diodes 32 to 40 is sufficient to cause any one of the respective transistors 52 to 61 to conduct and therefore none of the lamps 2 to 11 is illuminated. However, when a school child speaks the microphone 1 receives the sound which is passed through the amplifier 20 and the level-measuring diode network 21 to produce an additional current through the series diode-resistor network 29. If this current is sufficient than the increase in voltage with respect to connection 25, applied by way of connection 28 and resistor 42 to the base electrode of transistor 52, is sufficient to cause transistor 52 to be rendered conductive thus energizing lamp 2 to cause it to be illuminated. If the increase in sound at the microphone 1 is such that the increase in voltage is not above a predetermined amount (for example 0.7 volt), then only transistor 52 will be rendered conductive. The voltage drop across diode 32 is such (for example 0.7 volt) that very little (if any) of this small increase is applied to the base electrode of transistor 53 so that it remains non-conductive. However, if the sound applied to microphone 1 is greater than the resultant voltage increase on connection 28 is greater and a resultant greater voltage increase is applied to the base electrode of transistor 53 through resistor 43. Transistor 53 then conducts and lamp 3 is illustrated.

As the voltage increase due to a greater level of sound so further lamps are illuminated as an increased voltage is applied to the base electrodes of transistors 53, 54, 55 . . . . In this way, the number of lamps 2 to 11 which are energized so as to be illuminated is dependent on the additional voltage applied through the diode-resistor network which is itself dependent on the level of the sound arriving at the microphone 1. Thus, the school child has a clear and automatic indication as to how loud he is speaking. Adjustment of the sensitivity of the indicator so that the lamps 2 to 11 are energized at the sound volume required by the teacher can be achieved by way of the variable resistor 24.

The circuit components, including the resistors 42 to 51 will, of course, be so chosen as to ensure that, as the sound level increases, so the lamps 2 to 11 are illuminated in turn to indicate the level of loudness. The resistor 41 is preferably so chosen as to permit a current of approximately 500 milliamps in the diode-resistor network and resistors 42 to 51 may conveniently each have a resistance of 220 ohms.

Figure 3:
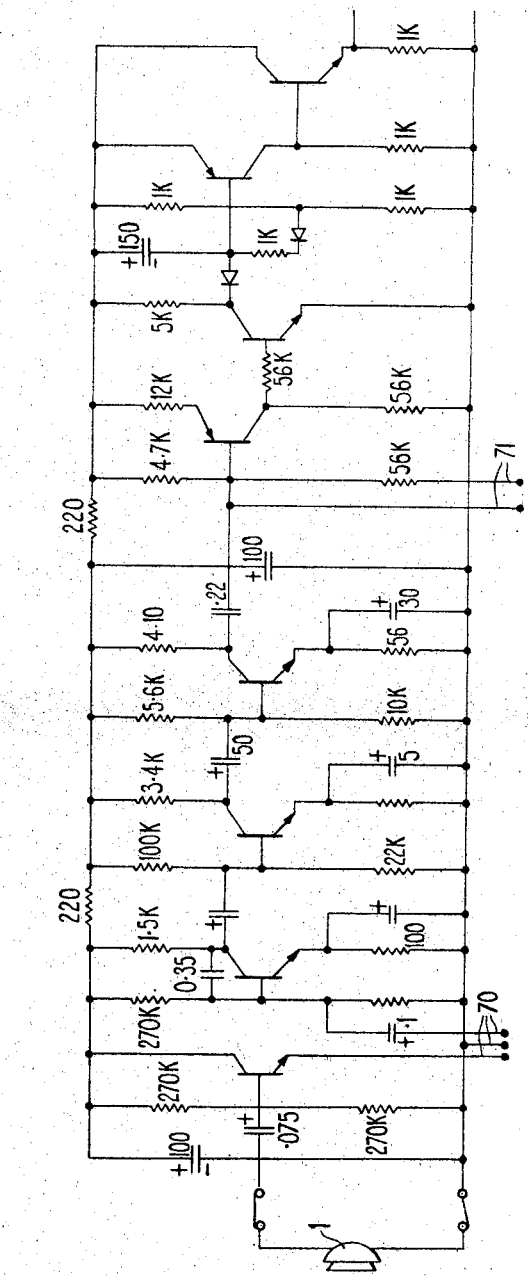
FIGURE 3 is a circuit diagram of an amplifier suitable for use in the embodiment of FIGURE 2 together with an alternative level-measuring network.

In FIGURE 2, diode level-measuring network 21 may be replaced by an alternative solid state circuit and one such circuit is illustrated in FIGURE 3 which also includes an illustration of an amplifier circuit, such as identified by the numeral 20 in FIGURE 2. Connections 70 in FIGURE 3 are connected to a variable resistor (not shown) of 5K ohms. value for use as a sensitivity control whilst connections 71 are connected to a variable resistor (not shown) of 1 megohm value for use as a threshold control.

Microphone 1 may, of course, be mounted within the casing of instrument 12, with a suitable opening for sound entry, so as to prevent damage due to mischievous children.

Furthermore instead of providing lamps and colour coded lamp covers on the outside of the indicator, the front cover of the instrument may be provided with a semi-transparent front panel consisting of a plurality of 2" wide vertical strips each of a different colour. The lamps 2 to 11 can then all be the normal white lamps, for simple storage of replacements, each positioned behind a different one of the coloured strips.

The front cover of the instrument may, of course, be easily removable for maintenance and replacement of the illuminating lamps.

In the case of children fewer lamps may be required to cope with their range of voice sound. For example, seven (7) lamps may be adequate in practice.

We claim:
1. An indicator for visually indicating the level of sound including:
(a) translating means for converting sound waves to electrical waves;
(b) means for amplifying the electrical waves;
(c) a level-measuring network connected to the output of the amplifying means and adapted to control a plurality of control circuits;
(d) the plurality of control circuits each having a respective one of a plurality of indicating lamps connected in circuit with it to control the illumination thereof;
(e) whereby as the sound level received by said translating means increases the lamps are illuminated in turn to indicate the level of said sound.

2. An indicator for visually indicating the level of sound including:
(a) translating means for converting sound waves to electrical waves;
(b) means for amplifying the electrical waves;
(c) a level-measuring network connected to the output of the amplifying means;

(d) a series diode-resistor network connected to the output of the level-measuring network whereby an increased current is passed through at least a part of the diode-resistor network in proportion to the level of said sound;

(e) a plurality of tapping points provided at intervals along said diode-resistor network;

(f) a plurality of transistor control circuits each having a respective one of a plurality of indicating lamps connected in circuit with it to control the illumination thereof; and (g) each transistor control circuit including a transistor having a control electrode connected to a respective one of said tapping points;

(h) whereby as the sound level received by said translating means increases the lamps are illuminated in turn to indicate the level of said sound.

3. An indicator for visually indicating the level of sound including:

(a) translating means for converting sound waves to electrical waves;

(b) means for amplifying the electrical waves;

(c) a level-measuring diode network connected to the output of the amplifying means;

(d) a series diode-resistor network connected to the output of the level-measuring diode network whereby an increased current is passed through at least a part of the diode-resistor network in proportion to the level of said sound;

(e) a plurality of tapping points provided at intervals along said diode-resistor network;

(f) a plurality of transistor control circuits each having a respective one of a plurality of indicating lamps connected in circuit with it to control the illumination thereof; and (g) each transistor control circuit including a transistor having a control electrode connected to a respective one of said tapping points;

(h) whereby as the sound level received by said translating means increases the lamps are illuminated in turn to indicate the level of said sound.

4. An indicator according to claim 1, wherein the front cover of the indicator is a semi-transparent front panel having a plurality of parallel strips each of a different colour and wherein a different one of said indicating lamps is positioned behind each colour strip.

5. An indicator according to claim 2 wherein the control electrode of the first of said transistors is connected to the first tapping point and said first tapping point is connected to the output of said level-measuring network whereby an increase in the output voltage of said level-measuring network results in an increase in the voltage applied to the control electrode of said first transistor.

6. An indicator according to claim 3 wherein the control electrode of the first of said transistors is connected to the first tapping point and said first tapping point is connected to the output of said level-measuring network whereby an increase in the output voltage of said level-measuring network results in an increase in the voltage applied to the control electrode of said first transistor.

7. An indicator according to claim 5 wherein the control electrode of the second of said transistors is connected to the second of said tapping points, said second tapping point being connected to the first tapping point by a first diode of said diode-resistor network and successive tapping points being connected to each adjacent tapping point by a respective further one of the diodes in said series diode-resistor network.

8. An indicator according to claim 2 wherein a variable resistor is connected across the output of said amplifying means to adjust the sensitivity of the indicator.

9. An indicator according to claim 2 including a rectifier bridge circuit for causing a standing current to flow through said series diode-resistor network.

10. An indicator according to claim 2, wherein the front cover of the indicator is a semi-transparent front panel having a plurality of parallel strips each of a different colour and wherein a different one of said indicating lamps is positioned behind each colour strip.

11. An indicator according to claim 3 wherein the front cover of the indicator is a semi-transparent front panel having a plurality of parallel strips each of a different colour and wherein a different one of said indicating lamps is positioned behind each colour strip.

12. An indicator according to claim 6 wherein the control electrode of the second of said transistors is connected to the second of said tapping points, said second tapping point being connected to the first tapping point by a first diode of said diode-resistor network and successive tapping points being connected to each adjacent tapping point by a respective further one of the diodes in said series diode-resistor network.

13. An indicator according to claim 3, wherein a variable resistor is connected across the output of said amplifying means to adjust the sensitivity of the indicator.

14. An indicator according to claim 3, including a rectifier bridge circuit for causing a standing current to flow through said series diode-resistor network.

References Cited

UNITED STATES PATENTS 2,969,530   1/1961   Duncan _____ 340—261

JOHN W. CALDWELL, Primary Examiner

H. I. PITTS, Assistant Examiner

U.S. Cl. X.R.

340—258, 261, 366, 381